United States Patent
Ekanayake et al.

(10) Patent No.: US 9,140,184 B2
(45) Date of Patent: Sep. 22, 2015

(54) SUPERCHARGED COMBINED CYCLE SYSTEM WITH AIR FLOW BYPASS TO HRSG AND FAN

(71) Applicant: General Electric Company, Schenectady, NY (US)

(72) Inventors: Sanji Ekanayake, Mableton, GA (US); Alston Ilford Scipio, Mableton, GA (US); Timothy Tah-teh Yang, Greenville, SC (US); Julio Enrique Mestroni, Marietta, GA (US); Kurt Waldner, Marietta, GA (US); Tedd Sellers, Williamsburg, VA (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 13/721,870

(22) Filed: Dec. 20, 2012

(65) Prior Publication Data

US 2013/0318987 A1 Dec. 5, 2013

Related U.S. Application Data

(63) Continuation-in-part of application No. 13/485,160, filed on May 31, 2012.

(51) Int. Cl.
| | |
|---|---|
| *F02C 6/00* | (2006.01) |
| *F02C 6/04* | (2006.01) |
| *F02C 6/18* | (2006.01) |
| *F02C 7/143* | (2006.01) |
| *F02C 1/00* | (2006.01) |
| *F02C 7/057* | (2006.01) |

(52) U.S. Cl.
CPC . *F02C 6/00* (2013.01); *F02C 1/007* (2013.01); *F02C 6/04* (2013.01); *F02C 6/18* (2013.01); *F02C 7/143* (2013.01); *F02C 7/057* (2013.01); *Y02E 20/14* (2013.01); *Y02E 20/16* (2013.01)

(58) Field of Classification Search
CPC .............. F02C 7/00; F02C 7/04; F02C 7/057; F02C 7/143; F02C 3/34; F02C 6/18; F01K 23/10; Y02E 20/16
USPC .............................. 60/39.182, 728, 794, 39.5
See application file for complete search history.

(56) References Cited

U.S. PATENT DOCUMENTS

| | | | | |
|---|---|---|---|---|
| 2,845,776 A | * | 8/1958 | Traupel | 60/785 |
| 3,568,016 A | * | 3/1971 | Barber | 318/78 |
| 3,796,045 A | * | 3/1974 | Foster-Pegg | 60/772 |

(Continued)

OTHER PUBLICATIONS

U.S. Appl. No. 13/485,216, filed May 31, 2012, John Anthony Conchieri.

(Continued)

*Primary Examiner* — William H Rodriguez
*Assistant Examiner* — Rene Ford
(74) *Attorney, Agent, or Firm* — Ernest G. Cusick; Frank A. Landgraff

(57) ABSTRACT

A supercharging system includes a fan providing an air flow, and a prime mover that drives the fan. A duct directs a first portion of the air flow to a gas turbine system, a main bypass subsystem diverts a second portion of the air flow to a heat recovery steam generator; and a drive bypass subsystem that diverts a third portion of the air flow to the prime mover. The prime mover may be one of an aeroderivative gas turbine, a gas turbine, a reciprocating engine, a steam turbine and an induction motor and a variable frequency drive.

19 Claims, 12 Drawing Sheets

(56) References Cited

U.S. PATENT DOCUMENTS

| | | | | |
|---|---|---|---|---|
| 4,369,630 | A | * | 1/1983 | Bloomfield ............... 60/718 |
| 5,442,904 | A | * | 8/1995 | Shnaid .................... 60/783 |
| 5,724,806 | A | * | 3/1998 | Horner .................... 60/785 |
| 5,778,675 | A | * | 7/1998 | Nakhamkin ............... 60/652 |
| 5,937,633 | A | * | 8/1999 | Wang ...................... 60/792 |
| 6,050,080 | A | * | 4/2000 | Horner .................... 60/784 |
| 6,308,512 | B1 | | 10/2001 | Kopko |
| 6,442,942 | B1 | | 9/2002 | Kopko |
| 6,530,224 | B1 | | 3/2003 | Conchieri |
| 6,606,848 | B1 | | 8/2003 | Rollins, III |
| 6,718,771 | B1 | | 4/2004 | Kopko |
| 6,880,343 | B2 | | 4/2005 | Kopko |
| 7,065,953 | B1 | | 6/2006 | Kopko |
| 2001/0039797 | A1 | * | 11/2001 | Cheng ................. 60/39.182 |
| 2003/0106319 | A1 | | 6/2003 | Kopko |
| 2003/0182944 | A1 | * | 10/2003 | Hoffman et al. ........... 60/772 |
| 2005/0044859 | A1 | * | 3/2005 | Rybarczyk et al. ........ 60/784 |
| 2006/0225432 | A1 | * | 10/2006 | Awdalla .................. 60/792 |
| 2010/0232561 | A1 | * | 9/2010 | Boss ...................... 376/241 |
| 2012/0260667 | A1 | * | 10/2012 | Chillar et al. ............. 60/779 |

OTHER PUBLICATIONS

U.S. Appl. No. 13/485,273, May 31, 2012, Sanji Ekanayake.
U.S. Appl. No. 13/721,946, filed Dec. 20, 2012, Ekanayake.
U.S. Appl. No. 13/751,603, filed Jan. 28, 2013, Ekanayake.
Brandon et al, "Inlet Air Supercharging of a 70 kW Microturbine" Proceedings of GT2006 ASME Turbo Expo 2006: Power for Land, Sea and Air May 8-11, 2006, Barcelona, Spain.
Enhanced Turbine Output LLC, 3000 connecticut Ave, suite 317, Washington DC 20008, "Summary Description of Powercool", www.ETOLLC.COM, May 20, 2004, p. 1-2.
Howden Brochure, Variax Axial Flow Fans continually setting new standards, Howden Denmark NS, Industrivej 23, DK-4700 Naestved, Denmark, 2009, pp. 1-7, www.howden.com.
Voith Turbo, Voith Turbo GmbH & Co. KG, Jul. 12, 2002, pp. 1-20, www.Voithturbo.com.
Wang, T. and Braquet, L, "Assessment of Inlet cooling to enhance output of a fleet of gas turbines", Proceedings of the Thirtieth Industrial Energy Technology Conference, IETC 3,0New Orleans, May 6-9, 2008.

\* cited by examiner

| Prime Mover | Capital cost | Sub-system complexity | Maintenance cost | Cycle efficiency | Peak output at a fixed super-charger boost |
|---|---|---|---|---|---|
| Variable Frequency Drive Motor | Medium | Low | Low | Medium | Low |
| Induction Motor | Low | Low | Low | Low | Low |
| Steam Turbine | Medium | High | Medium | Medium | Medium |
| HD Gas Turbine | High | Medium | High | High | Very high |
| Aero Gas Turbine | High | Medium | Very high | Very high | Very high |
| Reciprocating Gas Engine | Medium | Medium | Medium | High | Very high |

Fig. 16

SUPERCHARGED COMBINED CYCLE SYSTEM WITH AIR FLOW BYPASS TO HRSG AND FAN

CROSS-REFERENCE TO RELATED APPLICATIONS

This application is a continuation in part of application Ser. No. 13/485,160, titled SUPERCHARGED COMBINED CYCLE SYSTEM WITH AIR FLOW BYPASS assigned to General Electric Company, the assignee of the present invention. This application is related to application Ser. No. 13/721,946 titled "SUPERCHARGED COMBINED CYCLE SYSTEM WITH AIR FLOW BYPASS TO HRSG AND HYDRAULICALLY COUPLED FAN" filed concurrently herewith.

TECHNICAL FIELD

The subject matter disclosed herein relates to combined cycle power systems and more particularly to supercharged combined cycle systems with air flow bypass.

BACKGROUND

Combined cycle power systems and cogeneration facilities utilize gas turbines to generate power. These gas turbines typically generate high temperature exhaust gases that are conveyed into a heat recovery steam generator (HRSG) that produces steam. The steam may be used to drive a steam turbine to generate more power and/or to provide steam for use in other processes.

Operating power systems at maximum efficiency is a high priority for any generation facility. Factors including load conditions, equipment degradation, and ambient conditions may cause the generation unit to operate under less than optimal conditions. Supercharging (causing the inlet pressure to exceed the ambient pressure) turbine systems as a way to increase the capacity of gas-turbine is known. Supercharged turbine systems typically include a variable speed supercharging fan located at the gas turbine inlet that is driven by steam energy derived from converting exhaust waste heat into steam. The supercharging fan is used to increase the air mass flow rate into the gas turbine so that the gas turbine shaft horsepower can be augmented.

A problem with conventional supercharged combined cycle systems is that they are uneconomical due primarily to the prevailing "spark spread." Spark spread is the gross margin of a gas-fired power plant from selling a given amount of electricity minus the cost of fuel required to produce that given amount of electricity. Operational, maintenance, capital and other financial costs must be covered from the spark spread. Another problem with conventional supercharged systems is that controlling the inlet fan is difficult. In many cases, the return on investment of such systems is not attractive. Conventional supercharged combined cycle systems do not provide customers with sufficient system flexibility, output and efficiency over the system life cycle. Additionally, those systems require significant modifications and are sometimes not compatible with legacy systems.

BRIEF DESCRIPTION OF THE INVENTION

In accordance with one exemplary non-limiting embodiment, the invention relates to a combined cycle system including a gas turbine subsystem having a compressor and an output side that provides an exhaust, and a heat recovery steam generation subsystem having an inlet. An exhaust duct is coupled to the gas turbine system and the inlet for transporting the exhaust to the heat recovery steam generation system. The system also includes a controllable air stream source that produces an air flow and a ducting assembly coupled to the controllable air stream source that conveys at least a portion of the air flow to the compressor. A bypass coupled to the controllable air stream source and the exhaust duct adapted to selectively convey at least a portion of the air flow to the inlet is also provided.

In another embodiment, a supercharging system is provided, the system including a forced draft fan providing a variable air flow. A duct that directs at least a portion of the air flow to a compressor and a bypass subsystem that diverts at least a portion of the air flow to a heat recovery steam generator are also provided. The system includes a control system coupled to the bypass subsystem and the forced draft fan.

In another embodiment, a method of operating a combined cycle system includes determining a first operating state and determining a desired operating state. The method includes determining a first mass flow quantity of air to be provided to a compressor and a second mass flow quantity of air to be provided to a heat recovery steam generator to achieve the desired operating state. The method includes providing source of controllable air flow, selectively conveying the first mass flow quantity of air into the compressor; and selectively conveying the second mass flow quantity of air to the heat recovery steam generator.

In another embodiment a combined cycle system is provided. The combined cycle system has a gas turbine subsystem having a compressor and an output side that provides an exhaust, an exhaust duct coupled to the gas turbine subsystem and a heat recovery steam generation subsystem coupled to the exhaust duct. A fan that produces an air flow is driven by a prime mover having a drive exhaust. A ducting assembly coupled to the fan that conveys at least a portion of the air flow to the compressor is provided. Additionally a main bypass coupled to the fan and the exhaust duct adapted to selectively convey at least a portion of the air flow to exhaust duct; and a drive bypass coupled to the fan and the prime mover adapted to selectively convey at least a portion of the air flow to the prime mover are provided. The prime mover may be one of an aeroderivative gas turbine, a gas turbine, a reciprocating engine, a steam turbine and an induction motor.

In another embodiment a supercharging system is provided having a fan providing an air flow and a prime mover coupled to the fan. The supercharging system also includes a duct that directs a first portion of the air flow to a gas turbine system, a main bypass subsystem that diverts a second portion of the air flow to a heat recovery steam generator, and a drive bypass subsystem that diverts a third portion of the air flow to the prime mover.

In another embodiment a method of operating a combined cycle system, is provided. The method includes the steps of determining a first operating state, and determining a desired operating state. The method includes determining a first mass flow quantity of air to be provided to a gas turbine compressor to achieve the desired operating state, determining a second mass flow quantity of air to be provided to a heat recovery steam generator to achieve the desired operating state, and determining a third mass flow quantity of air to be provided to a prime mover to achieve the desired operating state. The method also includes the steps of driving a fan with a prime mover to provide an air flow, and dividing the air flow into a first mass flow portion associated with the first mass flow quantity of air, a second mass flow portion associated with the second mass flow quantity of air, and a third mass flow portion associated with the third mass flow quantity of air. The method further includes conveying the first mass flow portion into a compressor, conveying the second mass flow quantity of air to the heat recovery steam generator, and conveying the third mass flow quantity of air to the prime mover.

Other features and advantages of the present invention will be apparent from the following more detailed description of the preferred embodiment, taken in conjunction with the accompanying drawings which illustrate, by way of example, the principles of certain aspects of the invention.

BRIEF DESCRIPTION OF THE DRAWINGS

FIG. 15 is a schematic illustration of an embodiment of a prime mover.

FIG. 16 is a table illustrating the advantages and disadvantages of different embodiments.

DETAILED DESCRIPTION OF THE INVENTION

Figure 1:
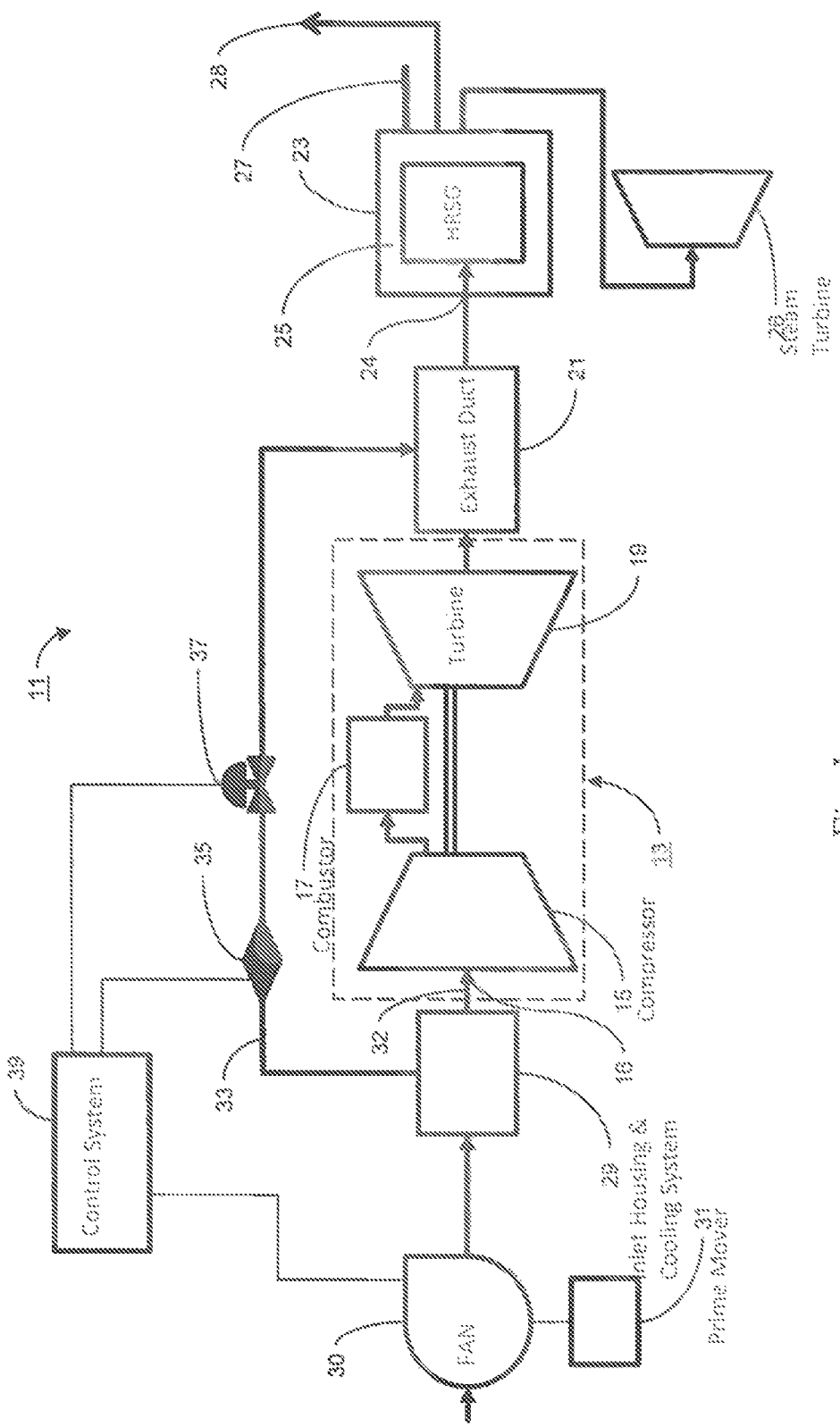
FIG. 1 is a schematic illustration of an embodiment of a supercharged combined cycle system with air bypass.

Illustrated in FIG. 1 is a schematic illustration of a supercharged combined cycle system with air bypass (SCCAB system 11) in accordance with one embodiment of the present invention. The SCCAB system 11 includes a gas turbine subsystem 13 that in turn includes a compressor 15, having a compressor inlet 16, a combustor 17 and a turbine 19. An exhaust duct 21 may be coupled to the turbine 19 and a heat recovery steam generator subsystem (HRSG 23). The HRSG 23 recovers heat from exhaust gases from the turbine 19 that are conveyed through HRSG inlet 24 to generate steam. The HRSG 23 may also include a secondary burner 25 to provide additional energy to the HRSG 23. Some of the steam and exhaust from the HRSG 23 may be vented to stack 27 or used to drive a steam turbine 26 and provide additional power. Some of the steam from the HRSG 23 may be transported through process steam outlet header 28 to be used for other processes. The SCCAB system 11 may also include an inlet house and cooling system 29. The inlet house and cooling system 29 is used to cool and filter the air entering the compressor inlet 16 to increase power and avoid damage to the compressor 15.

The SCCAB system 11 also includes a forced draft fan 30 used to create a positive pressure forcing air into the compressor 15. Forced draft fan 30 may have a fixed or variable blade fan (not shown) and an electric motor (not shown) to drive the blades. Forced draft fan 30 may be driven by a prime mover 31. The forced draft fan 30 provides a controllable air stream source though a duct assembly 32 and may be used to increase the mass flow rate of air into the compressor 15. The quantity of air going into the compressor is controlled by the prime mover 31. The compressor inlet 16 may be configured to accommodate slight positive pressure as compared to the slight negative pressure conventional design.

The SCCAB system 11 may also include a bypass 33 (which may include external ducting) that diverts a portion of the air flow from forced draft fan 30 into the exhaust duct 21. This increased air flow provides additional oxygen to the secondary burner 25 to avoid flame out or less than optimal combustion. Bypass 33 may be provided with a flow sensor 35 and a damper valve 37 to control the airflow through the bypass 33. A control system 39 may be provided to receive data from flow sensor 35 and to control the damper valve 37 and the prime mover 31. Control system 39 may be integrated into the larger control system used for operation control of SCCAB system 11. The airflow from the bypass is conveyed to the exhaust duct 21 where the temperature of the combined air and exhaust entering the HRSG 23 may be modulated.

Figure 2:
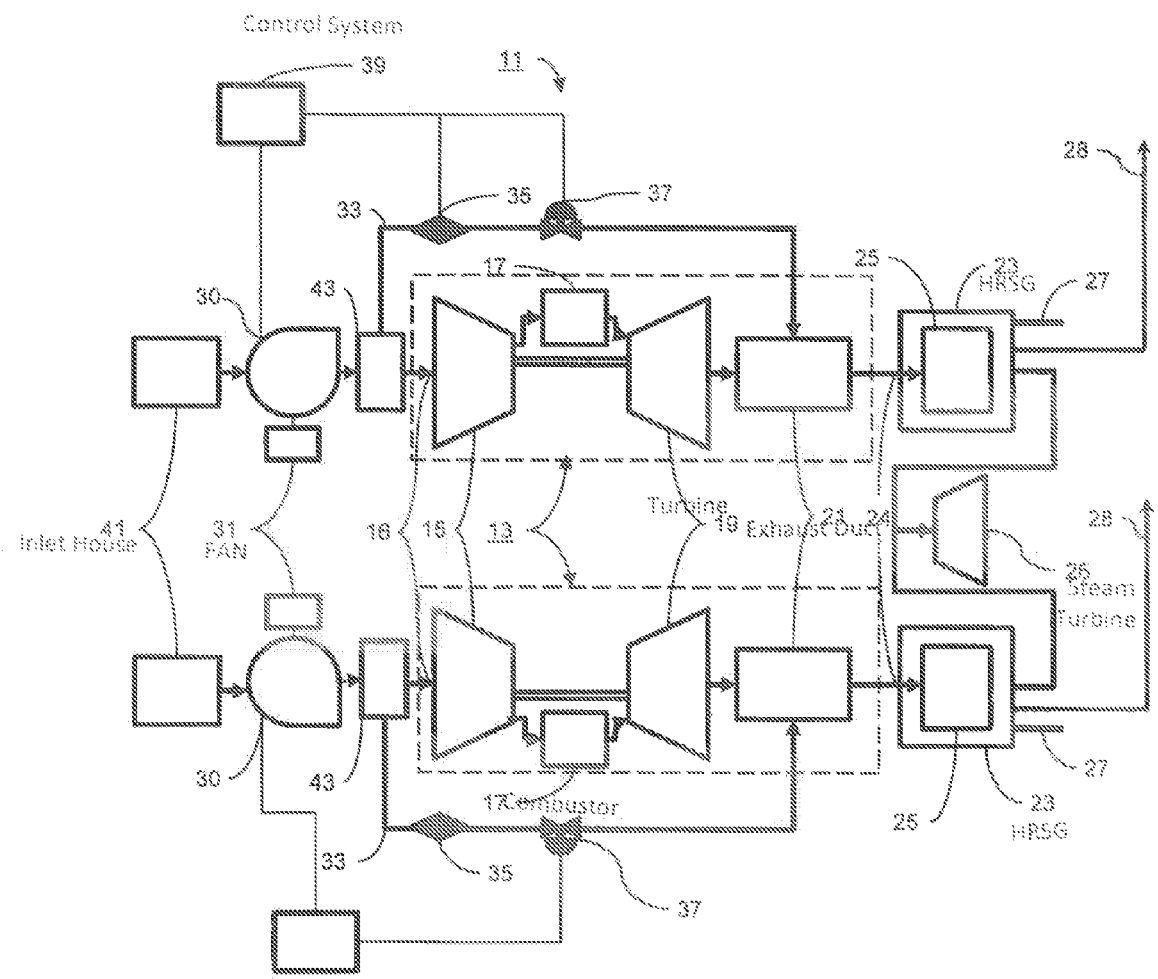
FIG. 2 is a schematic illustration of another embodiment of a supercharged combined cycle system with air bypass.

Illustrated in FIG. 2 is another embodiment of a SCCAB system 11 that includes a pair of gas turbine subsystem(s) 13. In this embodiment, the exhaust of the pair of gas turbine subsystem(s) 13 is used to drive a steam turbine 26. In this embodiment, an inlet house 41 is positioned upstream of the forced draft fan 30, and a cooling system 43, where the airflow from the fan may be cooled, is positioned downstream of the forced draft fan 30. The bypass 33 is coupled to the cooling system 43. One of ordinary skill in the art will recognize that although in this embodiment two gas turbine subsystem(s) 13 are described, any number of gas turbine subsystem(s) 13 in combination with any number of steam turbine(s) 27 may be used.

In operation, the SCCAB system 11 provides increased air flow into the HRSG 23 resulting in a number of benefits. The SCCAB system 11 may provide an operator with the ability to optimize combined cycle plant flexibility, efficiency and life-cycle economics. For example, boosting the inlet pressure of the gas turbine subsystem 13 improves output and heat rate performance. The output performance of the SCCAB system 11 may be maintained flat (zero degradation) throughout the life cycle of SCCAB system 11 by increasing the level of supercharging (and parasitic load to drive the forced draft fan 30) over time commensurate with the degradation of SCCAB system 11. Another benefit that may be derived from the SCCAB system 11 is the expansion of the power generation to steam production ratio envelope. This may be accomplished by modulating the exhaust gas temperature at HRSG inlet 24 with air from the forced draft fan 30. Another benefit that may be derived from the SCCAB system 11 is an improved start up rate as a result of the reduction in the purge cycle (removal of built up gas). The SCCAB system 11 may also provide an improved load ramp rate resulting from the modulation of the exhaust temperature at the exhaust duct 21 with air from the forced draft fan 30 provided through the bypass 33. The forced draft fan 30 of the SCCAB system 11 also provides an effective means to force-cool the gas turbine subsystem 13 and HRSG 23, reducing maintenance outage time and improves system availability. The forced draft fan 30 provides comparable benefit for simple cycle and combined-cycle configurations for all gas turbine subsystem(s) 13 delivering in the range of 20% output improvement under hot ambient conditions with modest capital cost.

Figure 3:
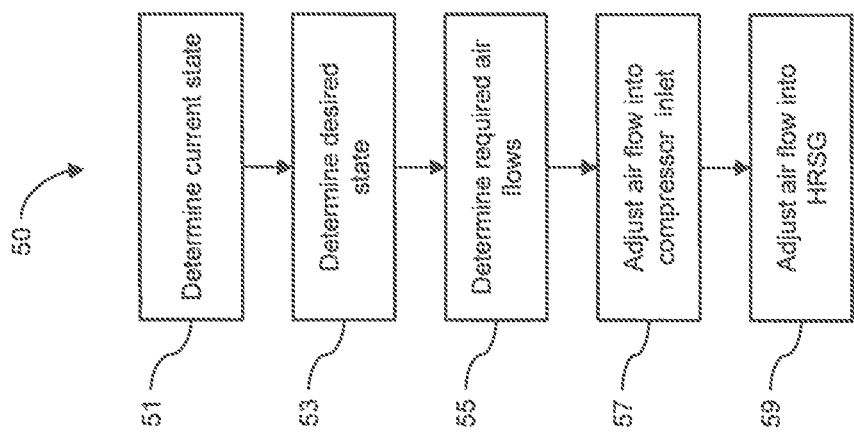
FIG. 3 is a flow chart of an embodiment of a method implemented by a supercharged combined cycle system with air bypass.

The SCCAB system 11 may implement a method of maintaining the output of a combined cycle plant over time (method 50) as illustrated with reference to FIG. 3. In step 51, the method 50 may determine the current state, and in step 53, the method 50 may determine a desired state. The desired state may be to maintain a nominal output over time to compensate for performance losses. Performance losses typically arise as a result of wear of components in the gas turbine over time. These losses may be measured or calculated. In step 55, the method 50 may determine the required increased air mass flow to maintain the desired output. Based on that determination, the method 50 may, in step 57 adjust the air mass flow into the compressor inlet 16. In step 59, the method 50 may adjust the combined air and exhaust mass flow into the HRSG inlet 24.

Figure 4:
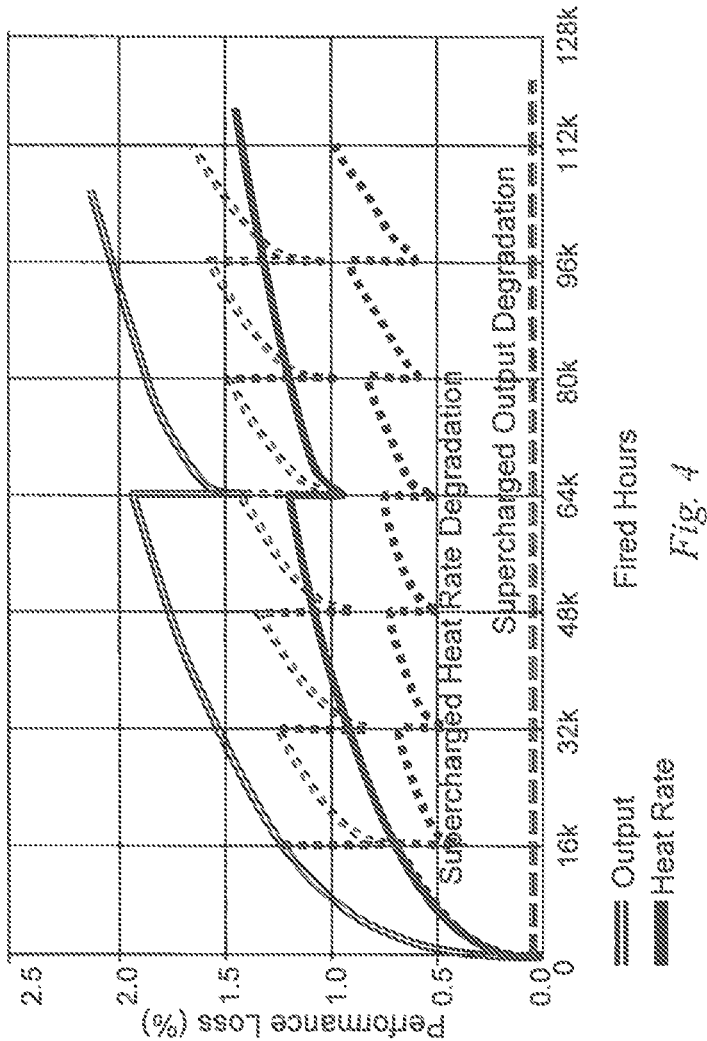
FIG. 4 is a chart illustrating a result accomplished by a supercharged combined cycle system with air bypass.

FIG. 4 illustrates the loss of output and heat rate over time (expressed in percentages) of a conventional combined cycle system and a SCCAB system 11. Gas turbines suffer a loss in output over time, as a result of wear of components in the gas turbine. This loss is due in part to increased turbine and compressor clearances and changes in surface finish and airfoil contour. Typically maintenance or compressor cleaning cannot recover this loss, rather the solution is the replacement of affected parts at recommended inspection intervals. However, by increasing the level of supercharging using forced draft fan 30 output performance may be maintained, although at a cost due to the parasitic load to drive the forced draft fan 30. The top curve (unbroken double line) illustrates the typical output loss of a conventional combined cycle system. The second curve (broken double lines) illustrates the expected output loss with periodic inspections and routine maintenance. The lower curve (broken triple line) shows that the output loss of an SCCAB system 11 may be maintained at near 0%. Similarly, the heat rate degradation of a conventional combined cycle system (single solid curve) may be significantly improved with an SCCAB system 11.

Figures 5, 6:
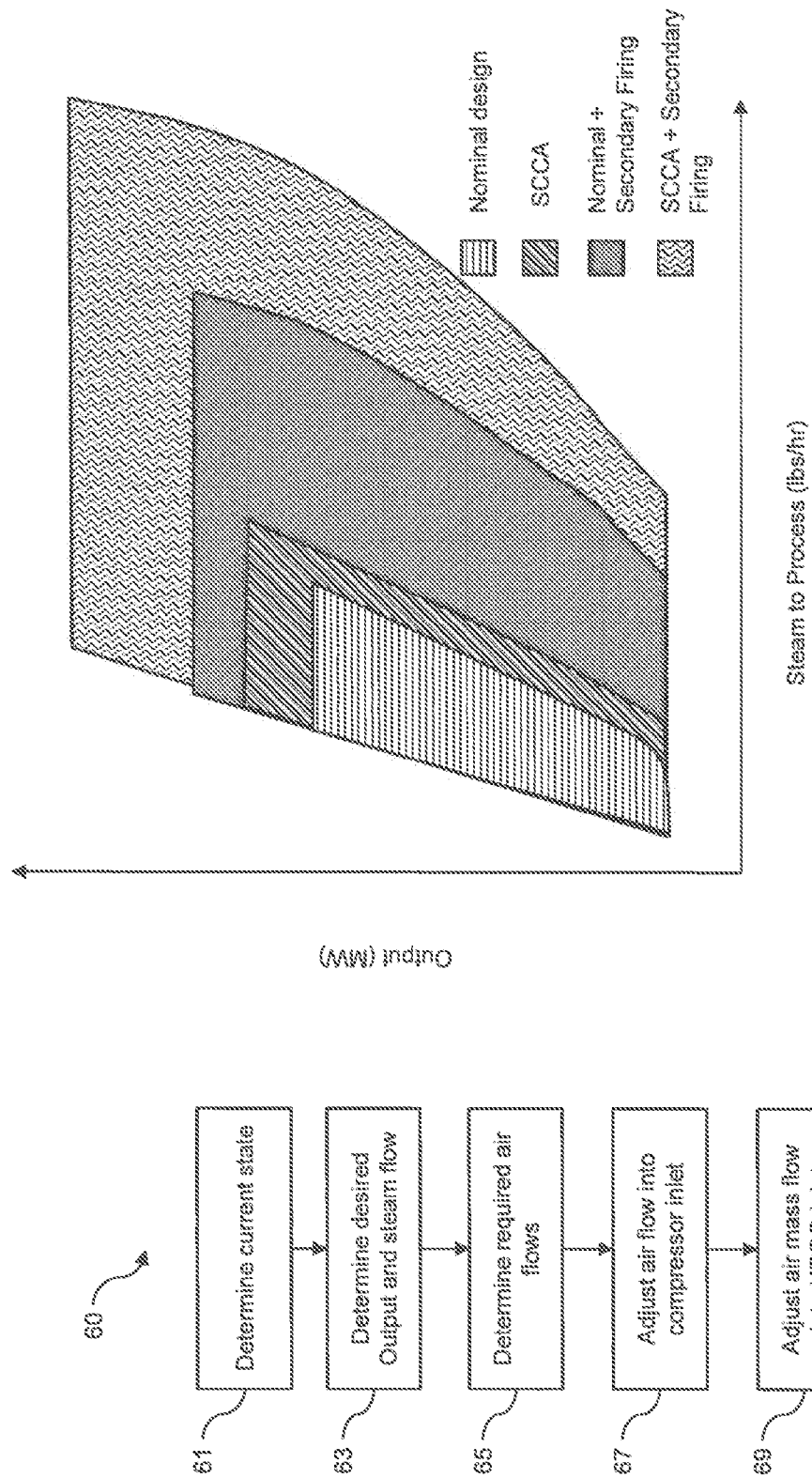
FIG. 5 is a flow chart of an embodiment of a method implemented by a supercharged combined cycle system with air bypass.
FIG. 6 is a chart illustrating a result accomplished by a supercharged combined cycle system with air bypass.

FIG. 5 illustrates a method of controlling the steam output of a SCCAB system 11 (method 60). In step 61, method 60 may initially determine the current state. In step 63, the method 60 may also determine the desired output and steam flow. In step 65, the method 60 may determine the required increased air flow to the compressor inlet 16 and the HRSG inlet 24. In step 67, method 60 may then adjust the air flow into the compressor inlet 16 and in step 69, adjust the combined exhaust and air flow into the HRSG inlet 24, to provide the desired steam output.

FIG. 6 illustrates expanded operating envelope to maintain constant steam flow. The vertical axis measures output in MW and horizontal axes measures steam mass flow. The interior area (light vertical cross hatch) shows the envelope of a conventional combined cycle system. The envelope of an SCCAB system 11 is shown in diagonal cross hatching, and a larger area illustrates the performance of an SCCAB system 11 combined with secondary firing in the HRSG 23.

Figure 7:
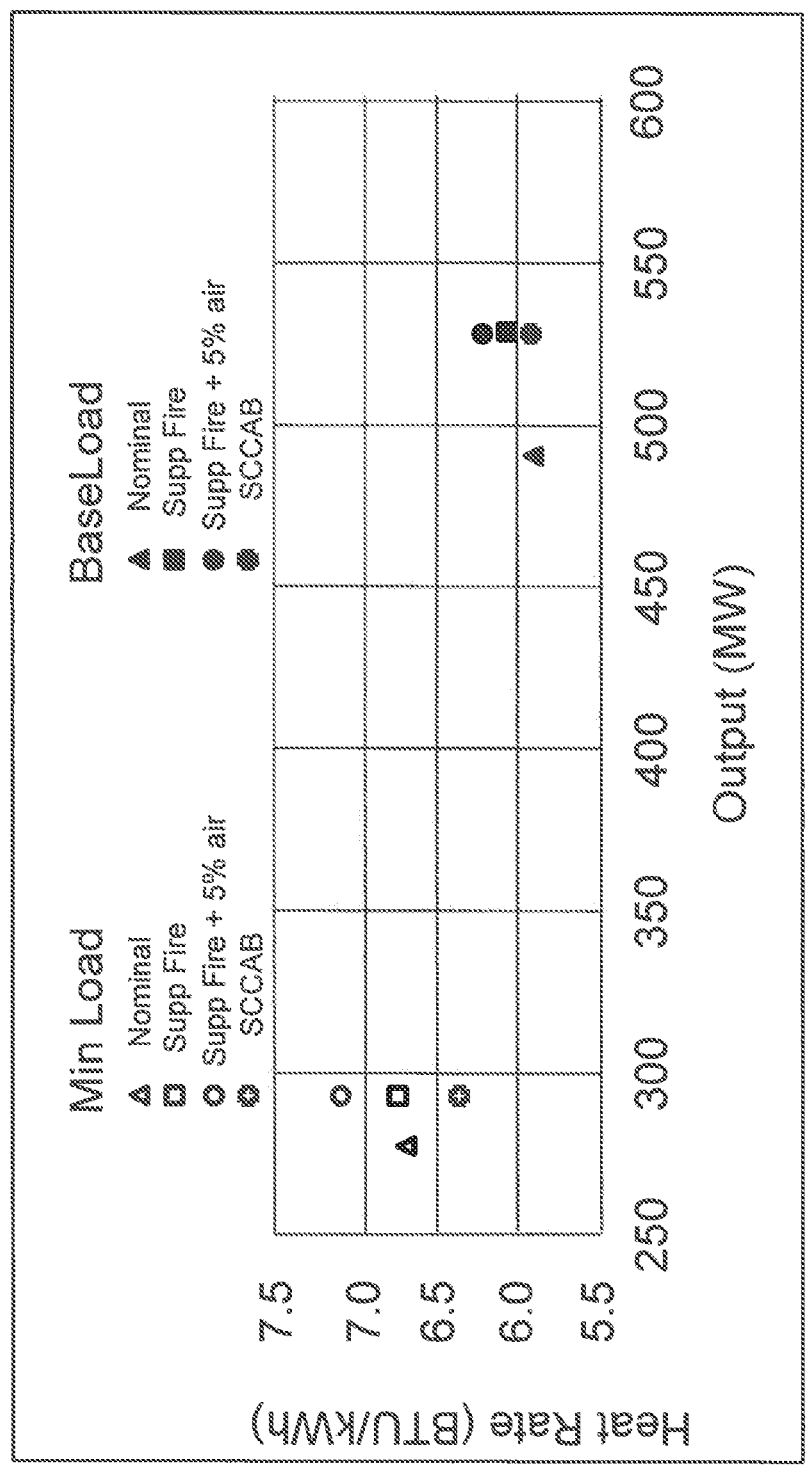
FIG. 7 is a chart illustrating a result accomplished by a supercharged combined cycle system with air bypass.

FIG. 7 is a chart that illustrates the improved operational performance of an SCCAB system 11 at a specific ambient temperature in comparison with conventional combined cycle systems at minimum and base loads. The horizontal axis measures output in MW and the vertical axis measures heat rate (the thermal energy (BTU's) from fuel required to produce one kWh of electricity). The chart illustrates the improved efficiency delivered by the SCCAB system 11.

Figure 8:
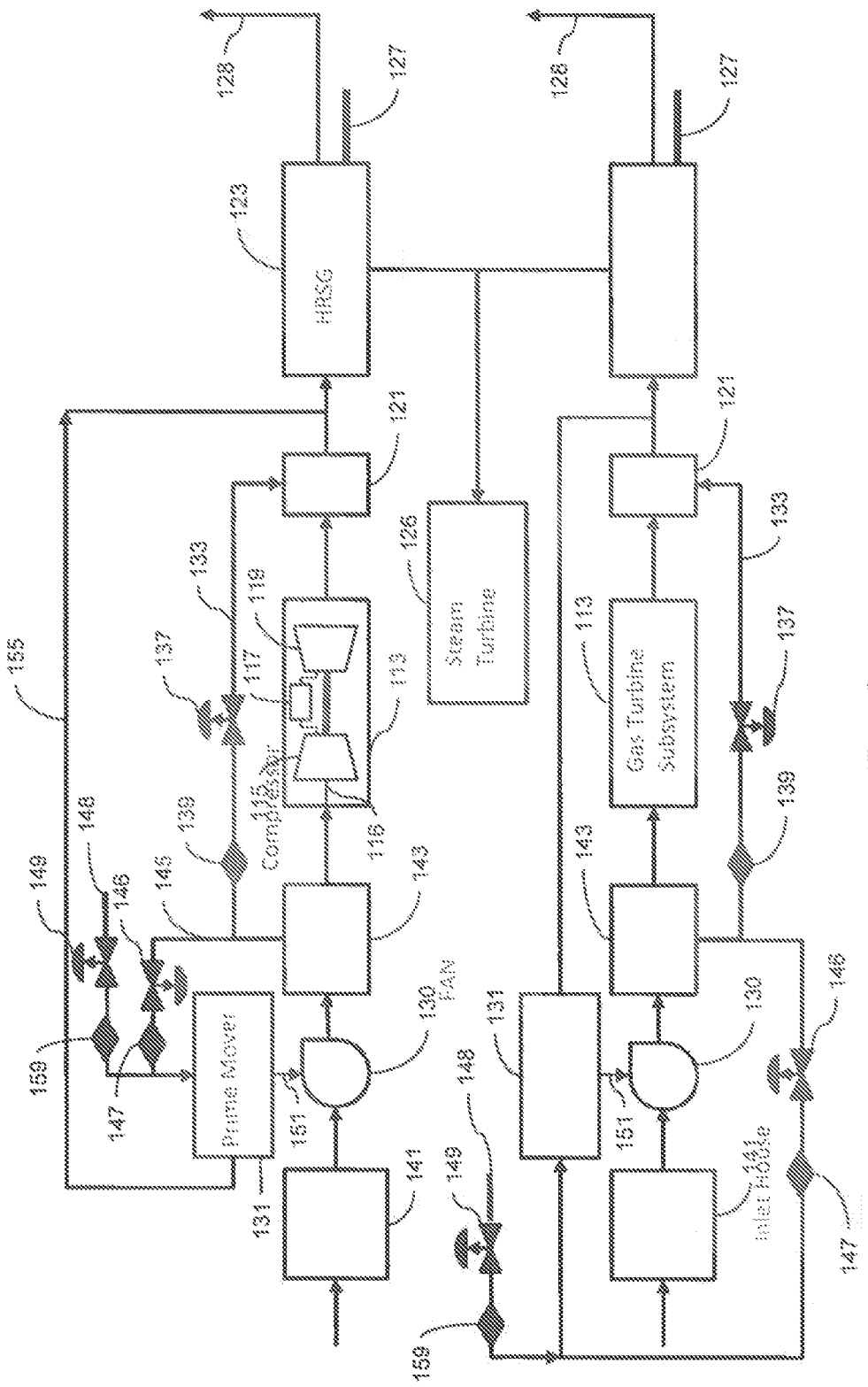
FIG. 8 is a schematic illustration of an embodiment of a supercharged combined cycle system with air bypass.

Illustrated in FIG. 8 is a schematic illustration of a combined cycle system 111 in accordance with another embodiment of the present invention. The combined cycle system 111 includes a gas turbine subsystem 113 that in turn includes a compressor 115, having a compressor inlet 116, a combustor 117 and a turbine 119. An exhaust duct 121 may be coupled to the gas turbine subsystem 113 and a heat recovery steam generator subsystem (HRSG 123). The HRSG 123 recovers heat from exhaust gases from the gas turbine subsystem 113 that are conveyed through HRSG inlet 124 to generate steam. Some of the steam and exhaust from the HRSG 123 may be used to drive a steam turbine 126 and provide additional power or vented to stack 127. Some of the steam from the HRSG 123 may be transported through process steam outlet header 128 to be used for other processes.

The combined cycle system 111 also includes a forced draft fan 130 used to create a positive pressure forcing air into the compressor 115. Forced draft fan 130 may be a fixed or variable blade fan. Forced draft fan 130 may be driven by a prime mover 131. The forced draft fan 130 provides a controllable air stream source though a duct assembly 132 and may be used to increase the mass flow rate of air into the gas turbine subsystem 113. The quantity of air going into the gas turbine subsystem 113 is controlled by the prime mover 131.

The combined cycle system 111 may also include a bypass 133 (which may include external ducting) that diverts a portion of the air flow from forced draft fan 130 into the exhaust duct 121. Bypass 133 may be provided with a flow sensor 139 and a bypass damper valve 137 to control the airflow through the bypass 133. The airflow from the bypass is conveyed to the exhaust duct 121 where the temperature of the combined air and exhaust entering the HRSG 123 may be modulated.

The combined cycle system 111 may also include a bypass 133 (which may include external ducting) that diverts a portion of the air flow from forced draft fan 130 into the exhaust duct 121. Bypass 133 may be provided with a flow sensor 139 and a bypass damper valve 137 to control the airflow through the bypass 133. The airflow from the bypass is conveyed to the exhaust duct 21 where the temperature of the combined air and exhaust entering the HRSG 23 may be modulated.

The combined cycle system 111 may also include a drive bypass 145 coupled to the prime mover 131. The drive bypass 145 is provided with a drive damper valve 146 and a drive system sensor 147. The prime mover 131 may also be provided with a secondary conduit 148 having a secondary damper valve 149 and a secondary sensor 150. The prime mover is coupled to the forced draft fan 130 by a conduit 151. In some embodiments, the exhaust of the prime mover 131 may be conveyed to the HRSG 23 through a drive exhaust conduit 155.

In operation, the prime mover 131 drives the forced draft fan 130 to provide an air flow at a predetermined mass flow rate. The air flow may be cooled by cooling system 143. The airflow may be divided into a first mass flow quantity to be conveyed to the compressor inlet 116, a second mass flow quantity to be conveyed to the exhaust duct 121, and in some cases a third mass flow quantity to be conveyed to the prime mover 131. Control of the first mass flow quantity, the second mass flow quantity, and the third mass flow quantity is effected Through the controls of bypass damper valve 137, drive damper valve 146, and secondary damper valve 149. By controlling the first mass flow quantity, the second mass flow quantity and the third mass flow quantity the operator is provided with more effective control of the operating envelope of the combined cycle system 111.

Figure 9:
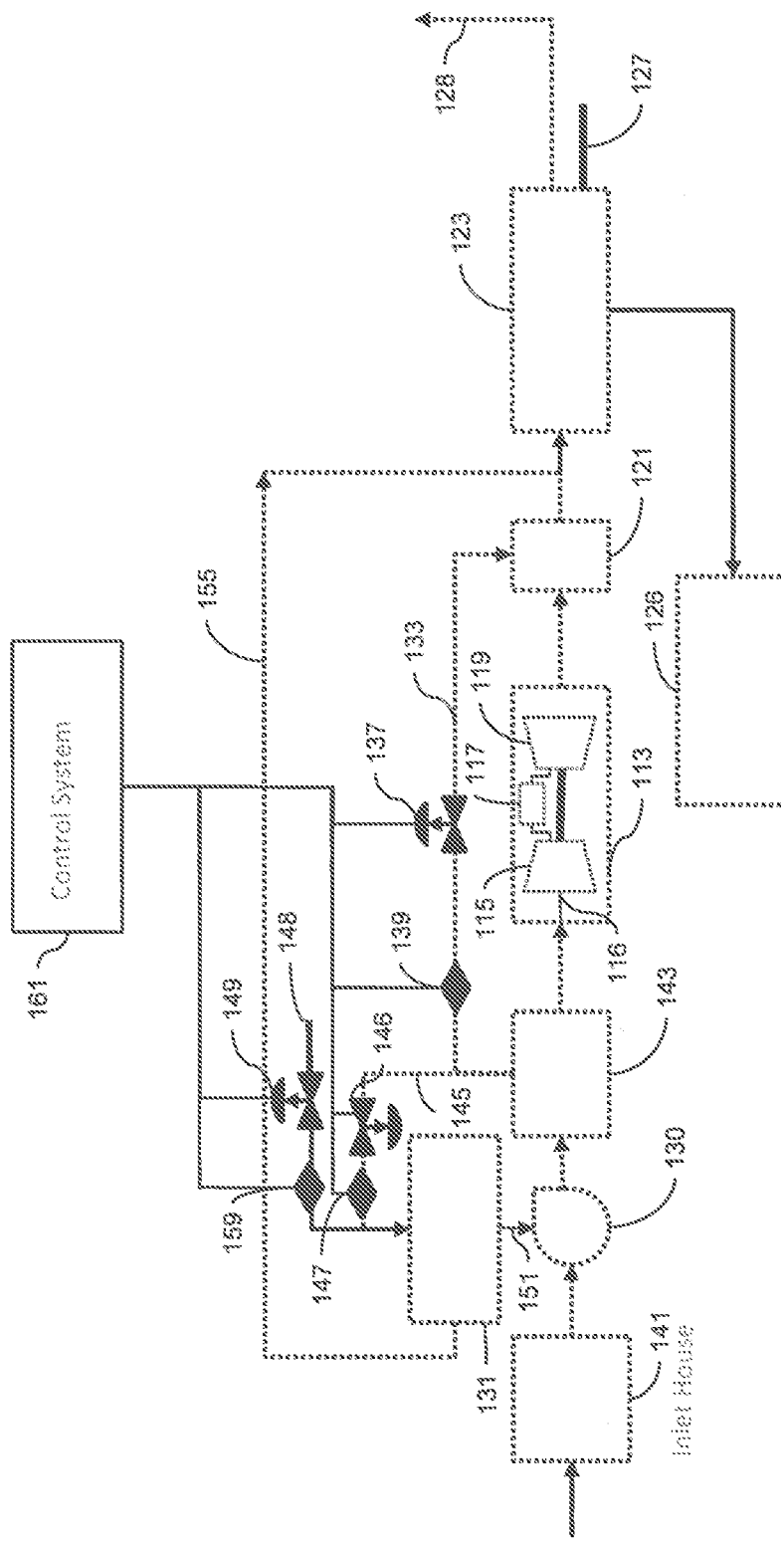
FIG. 9 is a schematic illustration of a control system for a supercharged combined cycle system with air bypass.

FIG. 9 illustrates the control system 161 used to control bypass damper valve 137, drive damper valve 146 and secondary damper valve 149. Control system 161 receives readings from flow sensor 139, drive system sensor 147 and secondary sensor 150. The control system 161 may be a conventional Speedtronic™ Mark VI Gas Turbine Control System (SpeedTronic and Mark are trademarks of General Electric Company). The SpeedTronic controller monitors various sensors and other instruments associated with a gas turbine. In addition to controlling certain turbine functions, such as fuel flow rate, the SpeedTronic controller generates data from its turbine sensors and presents that data for display to the turbine operator. The data may be displayed using software that generates data charts and other data presentations, such as the Cimplicity™ HMI software product (Cimplicity is a trademark of General Electric Company).

FIG. 9 illustrates the control system 161 used to control bypass damper valve 137, drive damper valve 146 and secondary damper valve 149. Control system 161 receives readings from flow sensor 139, drive system sensor 147 and secondary sensor 150. The control system 161 may be a conventional General Electric Speedtronic™ Mark VI Gas Turbine Control System. The SpeedTronic controller monitors various sensors and other instruments associated with a gas turbine. In addition to controlling certain turbine functions, such as fuel flow rate, the SpeedTronic controller generates data from its turbine sensors and presents that data for display to the turbine operator. The data may be displayed using software that generates data charts and other data presentations, such as the General Electric Cimplicity™ HMI software product.

The Speedtronic™ control system is a computer system that includes microprocessors that execute programs to control the operation of the gas turbine using sensor inputs and instructions from human operators. The control system includes logic units, such as sample and hold, summation and difference units, which may be implemented in software or by hardwire logic circuits. The commands generated by the control system processors cause actuators on the gas turbine to, for example, adjust the fuel control system that supplies fuel to the combustion chamber, set the inlet guide vanes to the compressor, and adjust other control settings on the gas turbine.

The control system 161 includes computer processors and data storage that convert the sensor readings to data using various algorithms executed by the processors. The data generated by the algorithms are indicative of various operating conditions of the gas turbine. The data may be presented on operator displays 163, such as a computer work station, that is electronically coupled to the operator display. The display and or controller may generate data displays and data printouts using software, such as Cimplicity™ data monitoring and control software application.

Figure 10:
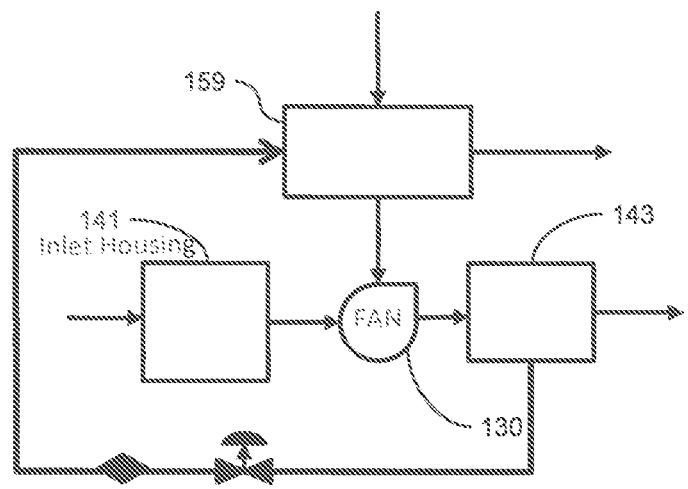
FIG. 10 is a schematic illustration of an embodiment of a prime mover.

Illustrated in FIG. 10 is an embodiment where the prime mover 131 is a gas turbine 171. Gas turbine 159 provides certain benefits over another type of prime mover 131. These benefit include greater reliability, particularly in applications where sustained high power output is required and high efficiencies at high loads. The drawback to the use of a gas turbine 171 as a prime mover 131 include lower efficiency that reciprocating engines at part loads and higher costs. In operation the gas turbine 171 receives supercharged and cooled air through drive bypass 145 and its exhaust may be conveyed to the HRSG 123 though drive exhaust conduit 155 for best cycle efficiency and flexibility. This results in excellent full-load and part-load efficiency and operational flexibility. The forced draft fan 130 driven by gas turbine 171 eliminates output degradation over time by trading efficiency to make up for output degradation. The forced draft fan 130 driven by gas turbine 171 also provides the operator with the ability to expand the power generation to steam production ratio envelope. Furthermore, the forced draft fan 130 driven by gas turbine 171, increases net power production and improves efficiency of gas turbine subsystem 113 combined cycle system 111. By expanding the operating envelope, the operator may reduce the negative capital & operating cost impact of needing to add a unit at a multi-unit power block where there is a partial output shortfall. The use of a gas turbine 171 has the disadvantages of high capital and maintenance costs. Gas turbine 171 provides a subsystem of medium complexity with high cycle efficiency and very high peak output at fixed supercharger boost.

Figure 11:
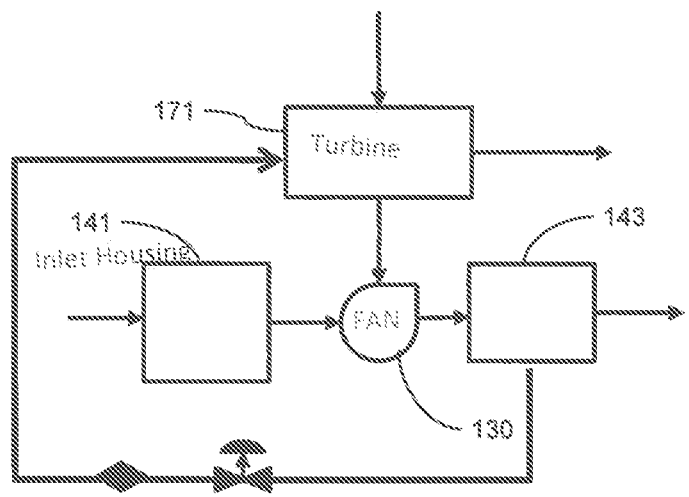
FIG. 11 is a schematic illustration of an embodiment of a prime mover.

FIG. 11 illustrates another embodiment where an aeroderivative gas turbine 173 is used as the prime mover 131. An aeroderivative gas turbine 173 is a gas turbine derived from an aviation turbine. The decision to use aeroderivative gas turbine 173 is mainly based on economical and operational advantages. They are relatively light weight and offer high performance and efficiency. Aeroderivative gas turbine 173 permits efficient control of torque together with potential for integrated control. Common economic/operational advantages and benefits of the aeroderivative gas turbine 173 compared to conventional heavy frame gas turbine drivers are a 10 to 15 percent improvement in efficiency. An aeroderivative gas turbine 173 provides smooth, controlled start. Aeroderivative gas turbine 173 has higher availability and operational reliability and its wide load range permits economically optimized power control. An aeroderivative gas turbine 173 also provides an advantage over conventional heavy frame gas turbine drivers due to its ability to be shut down, ramp up rapidly and handle load changes more efficiently. An aeroderivative gas turbine 173 provides high cycle efficiency and very high peak output at a fixed supercharger boost. The advantages of the aeroderivative gas turbine 173 for this application must be balanced against some disadvantages, including high capital costs and very high maintenance costs.

Figure 12:
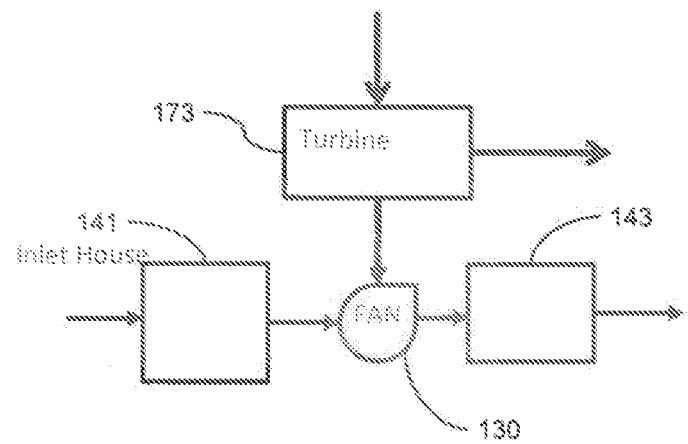
FIG. 12 is a schematic illustration of an embodiment of a prime mover.

FIG. 12 illustrates another embodiment where a steam turbine 175 is used as the prime mover 131. A steam turbine is a device that extracts thermal energy from pressurized steam and uses it to do mechanical work on a rotating output shaft. The use of a steam turbine 175 provides the advantage of being able to use wide range of fuels to drive the steam turbine 175. In comparison to the other prime movers, the steam turbine has a medium capital cost, maintenance cost, cycle efficiency, and peak output at fixed supercharger boost. Steam turbine 175 also has a high subsystem complexity. However, steam turbine 175 has the disadvantage of requiring boiler and other equipment and a higher price-to-performance ratio. A steam turbine 175 has a slow load change behavior, which means once running the steam turbine 175 cannot be stopped quickly. A specific amount of time is needed to slow down its revolutions. A steam turbine 175 also has poor part load performance.

Figure 13:
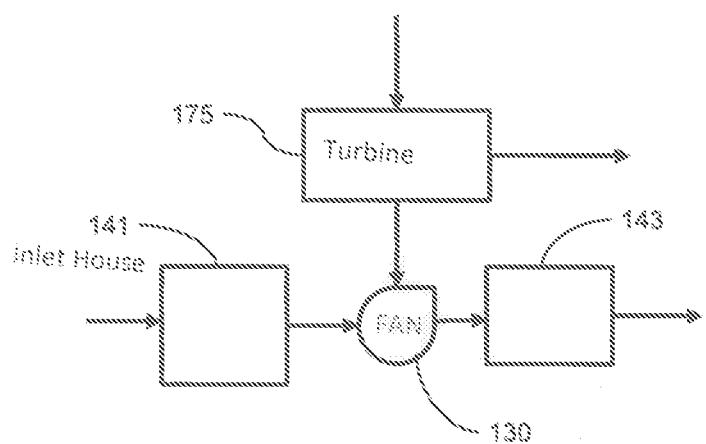
FIG. 13 is a schematic illustration of an embodiment of a prime mover.

FIG. 13 illustrates another embodiment where an induction motor 177 is used as the prime mover 131. An induction motor 177 is a type of AC motor where power is supplied to the rotor by means of electromagnetic induction, rather than a commutator or slip rings as in other types of motor. Induction motor 177 has the advantage of being rugged, easy to operate, and having low capital and maintenance costs. Induction motor 177 also has the advantage of providing a subsystem of low complexity. Another advantage of an induction motor 177 is the ability to regulate the torque output and modulate the energy output of the induction motor 177. Induction motor 177 has the disadvantage of having a low starting torque, low cycle efficiency and low peak output at fixed supercharger boost. Additionally, speed of the induction motor 177 decreases as the load increases.

Figure 14:
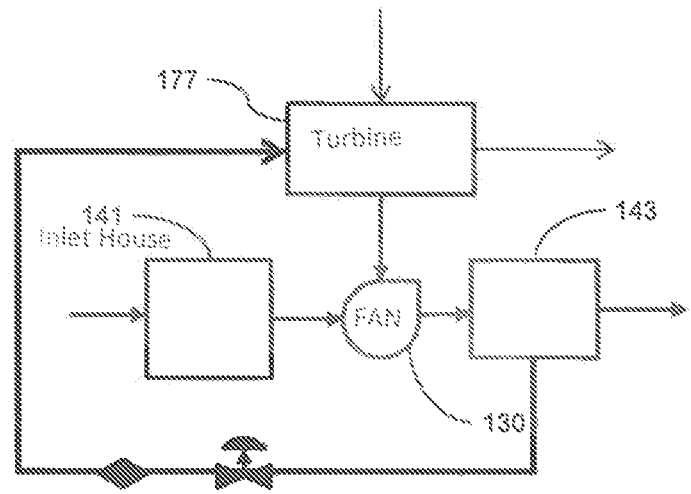
FIGS. 14 and 15 are a schematic illustrations of an embodiments of a prime mover.

FIG. 14 illustrates another embodiment where reciprocating engine 179 is used as the prime mover 131. A reciprocating engine 179, also often known as a piston engine, is a heat engine such as a diesel engine that uses one or more reciprocating pistons to convert pressure into a rotating motion. Use of a reciprocating engine 179 to drive the forced draft fan 130 has the advantage of providing high efficiencies at part load operation and high cycle efficiencies. Peak output at fixed supercharger boost is very high with a reciprocating engine 179, Additionally a reciprocating engine 179 has short start-up times to full loads. A reciprocating engine has average capital costs and maintenance cost. The complexity of the subsystem is average when compared to other prime movers.

Figure 15:
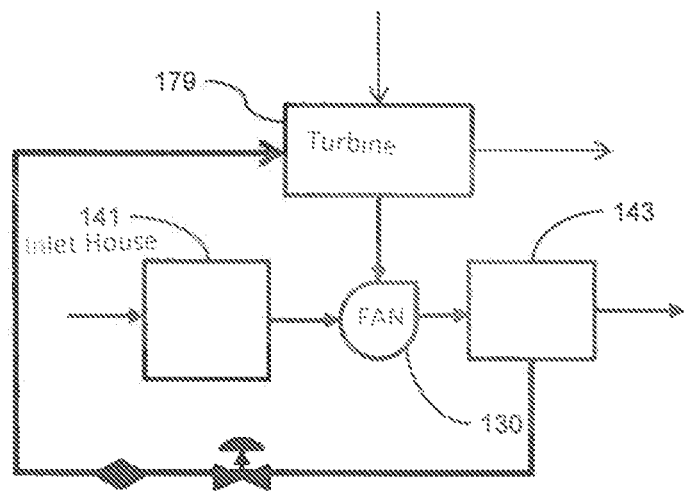

Illustrated in FIG. 15 is another embodiment where a variable frequency drive (VFD 181) is used as the prime mover 131. VFD 181 is a drive that controls the rotational speed of an electric motor by controlling the frequency of the electrical power supplied to the motor. VFD 181 provides a number of advantages, including low subsystem complexity and low maintenance costs as well as energy savings from operating at lower than nominal speeds. VFD 181 has average capital costs when compared with other prime movers and provides average cycle efficiency. Another advantage is that VFD 181 may be gradually ramped up to speed lessening the stress on the equipment. A disadvantage is lower than average peak output at a fixed supercharger boost.

The advantages and disadvantages of the different prime mover(s) 131 are summarized in the table in FIG. 16.

Figure 17:
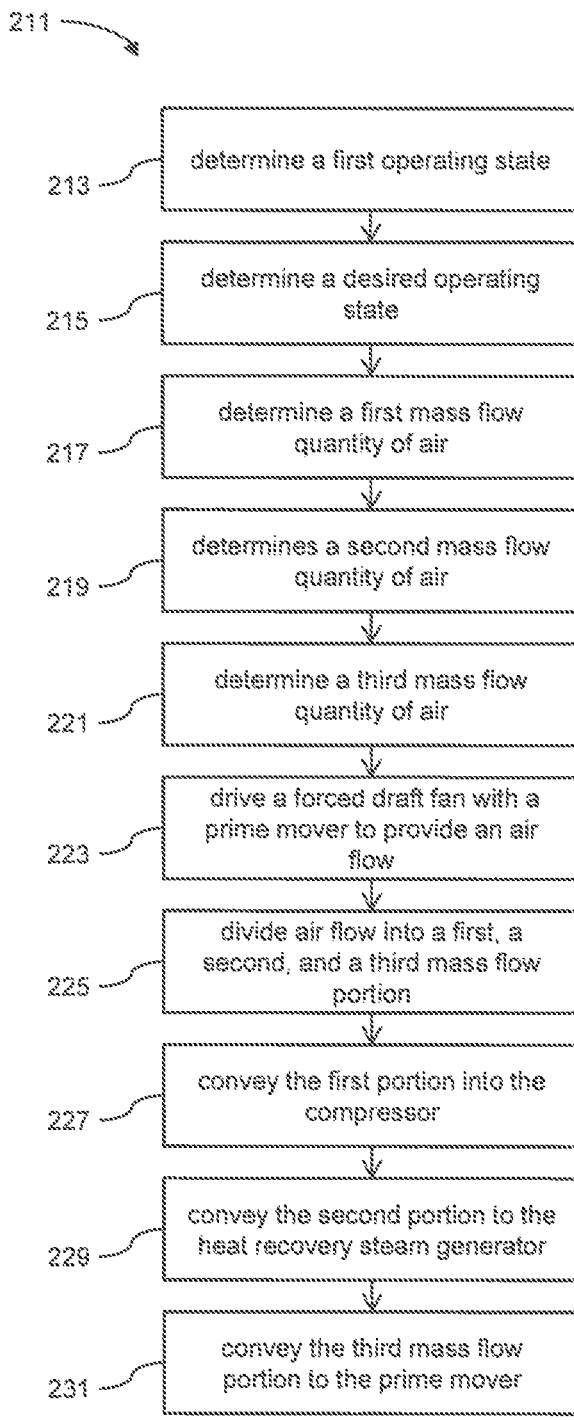
FIG. 17 is a flow chart of a method for operating a combined cycle system.

FIG. 17 is a flow chart of a method 211 for operating a combined cycle system 111.

In step 213 the operator determines a first operating state.

In step 215 the operator determines a desired operating state. An example of desired operating states may be an improved ramp up performance of a combined cycle system 111. Another desired operating state may be an expanded power generation to steam production ratio for a combined cycle system 111. Yet another desired operating state may be an operating state where output degradation over time is reduced by sacrificing efficiency of the of the combined cycle system 111. Another desired operating state may be increased net power production and improvement to the efficiency of the combined cycle system 111.

In step 217 the method 211 determines a first mass flow quantity of air to be provided to a gas turbine compressor to achieve the desired operating state.

In step 219 the method 211 determines a second mass flow quantity of air to be provided to a heat recovery steam generator to achieve the desired operating state.

In step 221 the method 211 determines a third mass flow quantity of air to be provided to a prime mover to achieve the desired operating state.

In step 223 the method 211 drives a forced draft fan with a prime mover to provide an air flow;

In step 225 the method 211 divides the air flow into a first mass flow portion associated with the first mass flow quantity, a second mass flow portion associated with the second mass flow quantity, and a third mass flow portion associated with the third mass flow quantity.

In step 227 the method 211 conveys the first mass flow portion into the compressor;

In step 229 the method 211 conveys the second mass flow portion to the heat recovery steam generator.

In step 231 the method 211 conveys the third mass flow portion to the prime mover.

The foregoing detailed description has set forth various embodiments of the systems and/or methods via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware. It will further be understood that method steps may be presented in a particular order in flowcharts, and/or examples herein, but are not necessarily limited to being performed in the presented order. For example, steps may be performed simultaneously, or in a different order than presented herein, and such variations will be apparent to one of skill in the art in light of this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A combined cycle system, comprising:
a gas turbine subsystem having a compressor and an output side that provides an exhaust;
an exhaust duct coupled to the gas turbine subsystem;
a heat recovery steam generation subsystem coupled to the exhaust duct;
a fan that produces an air flow;
a prime mover that drives the fan, the prime mover having a drive exhaust;
a ducting assembly coupled to the fan that conveys at least a portion of the air flow to the compressor;
a main bypass coupled to the fan and the exhaust duct to selectively convey at least a portion of the air flow to an exhaust duct; and
a drive bypass coupled to the fan and the prime mover to selectively convey at least a portion of the air flow to the prime mover, wherein the prime mover provides a drive exhaust conduit and further comprising drive ducting assembly that conveys a portion of the drive exhaust to the exhaust duct, the heat recovery steam generation subsystem, and the fan.

2. The combined cycle system of claim 1, wherein the prime mover comprises an aeroderivative gas turbine.

3. The combined cycle system of claim 1, wherein the prime mover comprises a gas turbine.

4. The combined cycle system of claim 1, wherein the prime mover comprises a reciprocating engine.

5. The combined cycle system of claim 1, wherein the prime mover comprises a steam turbine.

6. The combined cycle system of claim 1, wherein the prime mover comprises an induction motor.

7. A supercharging system for a combined cycle system, the combined cycle system comprising:
a gas turbine subsystem having a compressor and an output side that provides an exhaust;

an exhaust duct coupled to the gas turbine subsystem;
a heat recovery steam generation subsystem coupled to the exhaust duct;
wherein the supercharging system comprises;
a fan providing an air flow;
a prime mover coupled to the fan, the prime mover having a drive exhaust;
a duct that directs a first portion of the air flow to the gas turbine system;
a main bypass subsystem that diverts a second portion of the air flow to the heat recovery steam generator; and
a drive bypass subsystem that diverts a third portion of the air flow to the prime mover, wherein the prime mover provides a drive exhaust conduit and further comprising drive ducting assembly that conveys a portion of the drive exhaust to the exhaust duct, the heat recovery steam generation subsystem, and the fan.

8. The supercharging system of claim 7, wherein the prime mover comprises an aeroderivative gas turbine.

9. The supercharging system of claim 7, wherein the prime mover comprises a gas turbine.

10. The supercharging system of claim 7, wherein the prime mover comprises a reciprocating engine.

11. The supercharging system of claim 7, wherein the prime mover comprises a steam turbine.

12. The supercharging system of claim 7, wherein the prime mover comprises an induction motor.

13. A method of operating a combined cycle system, comprising:
determining a first operating state;
determining a desired operating state;
determining a first mass flow quantity of air to be provided to a gas turbine compressor to achieve the desired operating state;
determining a second mass flow quantity of air to be provided to a heat recovery steam generator to achieve the desired operating state;
determining a third mass flow quantity of air to be provided to a prime mover to achieve the desired operating state;
driving a fan with a prime mover to provide an air flow;
dividing the air flow from the prime mover into a first mass flow portion associated with the first mass flow quantity of air, a second mass flow portion associated with the second mass flow quantity of air, and a third mass flow portion associated with the third mass flow quantity of air;
conveying the first mass flow portion into a compressor;
conveying the second mass flow quantity of air to the heat recovery steam generator;
conveying the third mass flow quantity of air to the prime mover; and
conveying exhaust developed by the prime mover to an exhaust duct coupled to the gas turbine, the heat recovery steam generator, and the fan.

14. The method of claim 13, wherein driving a fan with a prime mover comprises driving the fan with an aeroderivative gas turbine.

15. The method of claim 13, wherein driving a fan with a prime mover comprises driving a fan with a gas turbine.

16. The method of claim 13, wherein the wherein driving a fan with a prime mover comprises driving a fan with a reciprocating engine.

17. The method of claim 13, wherein driving a fan with a prime mover comprises driving a fan with a steam turbine.

18. The method of claim 13, wherein driving a fan with a prime mover comprises driving a fan with an induction motor.

19. The method of claim 13, wherein the selectively conveying the third mass flow quantity of air comprises conveying the third mass flow quantity of air through a drive bypass to the prime mover.

* * * * *

UNITED STATES PATENT AND TRADEMARK OFFICE
CERTIFICATE OF CORRECTION

PATENT NO. : 9,140,184 B2
APPLICATION NO. : 13/721870
DATED : September 22, 2015
INVENTOR(S) : Ekanayake et al.

It is certified that error appears in the above-identified patent and that said Letters Patent is hereby corrected as shown below:

In the specification

In Column 4, Line 45, delete "turbine(s) 27" and insert -- turbine(s) 13 --, therefor.

In Column 6, below Line 28, insert -- The combined cycle system 111 may also include an inlet house 141 and cooling system 143. The inlet house 141 and cooling system 143 cool and filter the air entering the gas turbine subsystem 113 to increase power and avoid damage to the compressor. In some embodiments the inlet house 141 and the cooling system 143 may be combined and disposed downstream from the forced draft fan 130. --, as a new paragraph.

In Column 6, Lines 37-44, delete "The combined cycle system 111 may also include a bypass 133 (which may include external ducting) that diverts a portion of the air flow from forced draft fan 130 into the exhaust duct 121. Bypass 133 may be provided with a flow sensor 139 and a bypass damper valve 137 to control the airflow through the bypass 133. The airflow from the bypass is conveyed to the exhaust duct 21 where the temperature of the combined air and exhaust entering the HRSG 23 may be modulated.".

In Column 7, Lines 19-33, delete "FIG. 9 illustrates the control system 161 used to control bypass damper valve 137, drive damper valve 146 and secondary damper valve 149. Control system 161 receives readings from flow sensor 139, drive system sensor 147 and secondary sensor 150. The control system 161 may be a conventional General Electric Speedtronic™ Mark VI Gas Turbine Control System. The SpeedTronic controller monitors various sensors and other instruments associated with a gas turbine. In addition to controlling certain turbine functions, such as fuel flow rate, the SpeedTronic controller generates data from its turbine sensors and presents that data for display to the turbine operator. The data may be displayed using software that generates data charts and other data presentations, such as the General Electric Cimplicity™ HMI software product.".

Signed and Sealed this
Twenty-second Day of March, 2016

Michelle K. Lee
*Director of the United States Patent and Trademark Office*

CERTIFICATE OF CORRECTION (continued)
U.S. Pat. No. 9,140,184 B2

In the specification

In Column 7, Line 53, delete "and or" and insert -- and/or --, therefor.

In Column 9, Line 16, delete "179," and insert -- 179. --, therefor.

In the claims

In Column 11, Line 4, in Claim 7, delete "comprises;" and insert -- comprises: --, therefor.

In Column 12, Line 25, in Claim 16, delete "wherein the wherein" and insert -- wherein --, therefor.